(12) United States Patent
Kim et al.

(10) Patent No.: US 7,194,027 B2
(45) Date of Patent: Mar. 20, 2007

(54) CHANNEL EQUALIZING AND CARRIER RECOVERY SYSTEM FOR HOME PHONELINE NETWORKING ALLIANCE RECEIVER AND METHOD THEREOF

(75) Inventors: Jae-woo Kim, Kyungki-do (KR); Chang-hyun Yim, Suwon (KR); Hyun-cheol Park, Yongin (KR); Oh-sang Kwon, Suwon (KR); Jung-hoon Kim, Seoul (KR); Sung-hyun Hwang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 627 days.

(21) Appl. No.: 10/413,663

(22) Filed: Apr. 15, 2003

(65) Prior Publication Data

US 2003/0231708 A1    Dec. 18, 2003

(30) Foreign Application Priority Data

Jun. 15, 2002    (KR) .............................. 2002-33484

(51) Int. Cl.
*H03H 7/30* (2006.01)
*H03H 7/40* (2006.01)
*H03K 5/159* (2006.01)

(52) U.S. Cl. ...................... 375/233; 375/232; 375/350; 375/346; 708/322; 708/323

(58) Field of Classification Search ................ 375/231, 375/232, 233, 234, 295, 316, 350, 346, 299, 375/261; 708/322, 323; 370/509, 419; 329/306
See application file for complete search history.

(56) References Cited

U.S. PATENT DOCUMENTS

| 5,799,037 A | 8/1998 | Strolle et al. | 375/233 |
| 6,327,311 B1 * | 12/2001 | Ojard | 375/261 |
| 6,441,683 B1 * | 8/2002 | Hwang et al. | 329/306 |

(Continued)

FOREIGN PATENT DOCUMENTS

| JP | 6-90306 | 3/1994 |
| JP | 9-275426 | 10/1997 |

(Continued)

OTHER PUBLICATIONS

Bisaglia, Paola, et al., *Receiver Architectures for HomePNA 2.0*, Hewlett Packard Laboratories, Bristol, U.K., Oct. 17, 2001.

*Primary Examiner*—Phuong Phu
(74) *Attorney, Agent, or Firm*—F. Chau & Associates, LLC

(57) ABSTRACT

A channel equalizing and carrier recovery system for home phoneline networking alliance (HomePNA) receiver and method thereof are provided. The channel equalizing system includes a frequency diverse quadrature amplitude modulation (FD-QAM) equalizer and a quadrature amplitude modulation (QAM) equalizer. The FD-QAM equalizer receives an FD-QAM signal, determines FD-QAM tap coefficients, and equalizes the FD-QAM signal using the FD-QAM tap coefficients. The QAM equalizer receives a QAM signal, determines QAM tap coefficients, and equalizes the QAM signal using the QAM tap coefficients. The QAM equalizer receives the FD-QAM signal and determines the QAM tap coefficients during a predetermined header period. The carrier recovery circuit includes a phase detector, a loop filter, and a numerically controlled oscillator (NCO). The phase detector uses a phase difference between a reception symbol and a decision signal of the reception symbol as an instantaneous phase difference when the reception symbol is a data symbol of an FD-QAM signal or a symbol of a QAM signal, uses "0" as the instantaneous phase difference when the reception symbol is a zero symbol of the FD-QAM signal, averages instantaneous phase differences during a predetermined period or time, and outputs the result of averaging. The loop filter filters the output signal of the phase detector. The NCO generates an oscillation signal having a variable phase in response to an output signal of the loop filter so that a phase error of a reception signal can be controlled.

15 Claims, 9 Drawing Sheets

U.S. PATENT DOCUMENTS

| | | | | |
|---|---|---|---|---|
| 6,907,086 B2* | 6/2005 | Ojard | ........................ | 375/299 |
| 2002/0021165 A1* | 2/2002 | Hwang et al. | .............. | 329/306 |
| 2003/0156592 A1* | 8/2003 | Ojard et al. | ................ | 370/419 |
| 2003/0156656 A1* | 8/2003 | Ojard et al. | ................ | 375/295 |
| 2003/0206559 A1* | 11/2003 | Trachewsky et al. | ....... | 370/509 |

FOREIGN PATENT DOCUMENTS

| | | |
|---|---|---|
| JP | 2000-59455 | 2/2000 |
| KR | 1997-0024758 | 5/1997 |
| KR | 1999-0066518 | 8/1999 |

* cited by examiner

CHANNEL EQUALIZING AND CARRIER RECOVERY SYSTEM FOR HOME PHONELINE NETWORKING ALLIANCE RECEIVER AND METHOD THEREOF

CROSS-REFERENCE TO RELATED APPLICATIONS

This application claims priority to Korean Patent Application No. 2002-33484, filed Jun. 15, 2002, which is incorporated by reference herein in its entirety.

BACKGROUND OF THE INVENTION

1. Field of the Invention

The present invention relates to a communication system using a telephone line, and more particularly, to an adaptive channel equalizing system and carrier recovery circuit in a home phoneline networking alliance (HomePNA) receiver.

2. Description of the Related Art

The HomePNA is an association of companies committed to promulgating a single, unified phoneline home networking standard. The HomePNA standard (hereinafter Home-PNA) is a home networking solution using a single telephone line.

FIG. 1 is a schematic block diagram of a conventional equalizer and carrier recovery circuit system. Referring to FIG. 1, a receiver receiving a signal transmitted through a channel includes an equalizer 110, a decision device 120, a carrier recovery circuit 130, an error estimation device 140, and a mixer 150.

The equalizer 110 recovers a transmission signal distorted due to inter-symbol interference (ISI) and is realized as an adaptive equalizer. ISI occurs due to a band-limited channel characteristic of the telephone line.

The decision device 120 is a circuit that parses a signal from a transmission signal having one or more signals with various magnitudes and/or phases. The decision device 120 use a hard-decision method.

The carrier recovery circuit 130 compensates for a frequency error due to a disparity in oscillation frequency between a transmitter and a receiver or a phase error due to other causes. The carrier recovery circuit 130 receives an input signal from the mixer 150 and a signal output by the decision device 120 and estimates a carrier error from the two signals. The mixer 150 multiplies the carrier error output from the carrier recovery circuit 130 by an output signal of the equalizer 110 to counterbalance the carrier error. Consequently, any distortion due to the carrier error has been compensated for before the mixer 150 outputs a signal to the decision device 120.

The error estimation device 140 outputs an error signal to the equalizer 110 using an error between the reception signal before decision and the reception signal after decision and the carrier error estimated by the carrier recovery circuit 130. The equalizer 110 equalizes a reception signal r(t) using the error signal output from the error estimation device 140.

In the equalizer and carrier recovery circuit system shown in FIG. 1, the reception signal r(t) is channel-equalized by the equalizer 110 before the carrier error is compensated for by the carrier recovery circuit 130. The reception signal r(t) can be channel-equalized after being carrier error-compensated.

A conventional equalizer and carrier recovery circuit repeatedly performs channel equalization and carrier recovery on a reception signal according to a particular modulation mode applied to the reception signal.

In a HomePNA system according to a phoneline networking modem specification, different modulation modes exist within a single frame.

FIG. 2 is a diagram showing a frame structure in Home-PNA. Referring to FIG. 2, a frame is divided into a header, a payload, and a trailer. The header is a start region of the frame comprising information about the frame and includes a preamble. The payload is a user data region, and the trailer is an end region of the frame. Only frequency diverse quadrature amplitude modulation (FD-QAM) is used for the header and the trailer, and either FD-QAM or quadrature amplitude modulation (QAM) can be used for the payload. In FD-QAM, a zero symbol is inserted between symbols.

FIG. 3 is a diagram showing symbols in FD-QAM and QAM. Since a zero symbol is inserted between data symbols, a baud rate in the FD-QAM is one half of that in the QAM. For example, while the QAM has a 4 M baud rate, the FD-QAM has a 2 M baud rate.

FIG. 3(a) shows a case in which FD-QAM symbols having a 2 M baud rate are received and then QAM symbols having a 4 M baud rate are received, and FIG. 3(b) shows a case in which QAM symbols having a 4 M baud rate are received and then FD-QAM symbols having a 2 M baud rate are received.

When different modulation modes exist within a single frame, as shown in FIGS. 2 and 3, a conventional equalizer circuit equalizes a modulated signal using a coefficient estimated by an equalizer. When a different modulated signal is received, the modulated signal cannot be appropriately equalized.

A conventional equalizer circuit of a HomePNA system starts channel equalization using a preamble. Since the preamble uses only FD-QAM, a data region (i.e., a payload region) using FD-QAM can be satisfactorily channel-equalized using a coefficient obtained by an equalizer while the preamble is received. However, when channel equalization is performed on a data region using QAM continuously using a coefficient obtained by an equalizer while the preamble is received, convergence cannot be secured and a reception signal cannot be demodulated.

In addition, a conventional carrier recovery circuit estimates a carrier error using all of the received symbols regardless of a modulation mode for a received signal. When all of the received symbols are used in estimating a carrier error, it is difficult to estimate the carrier error in a section in which an FD-QAM signal is received due to zero symbols.

When a residual carrier error remains because a carrier recovery circuit does not adequately estimate a carrier error, channel equalization may not converge. Conversely, when an equalizer cannot compensate for interference between residual adjacent symbols, the carrier recovery circuit is badly affected and thus cannot adequately estimate a carrier error.

Accordingly, an equalizer and carrier recovery circuit for reliably equalizing received symbol signals and reliably estimating and compensating for a carrier error, even if different modulation modes exist within a single frame, are desired.

SUMMARY OF THE INVENTION

The present invention provides a channel equalizing system and method for reliably equalizing received symbol signals even if different modulation modes exist within a single frame.

The present invention also provides a carrier recovery circuit and method for reliably estimating and compensating for a carrier error even if different modulation modes exist within a single frame.

According to an embodiment of the present invention, an adaptive channel equalizing system for a home phoneline networking alliance (HomePNA) receiver comprises a frequency diverse quadrature amplitude modulation (FD-QAM) equalizer, which determines FD-QAM tap coefficients and equalizes an FD-QAM signal input thereto; and a quadrature amplitude modulation (QAM) equalizer, which receives the FD-QAM signal during a predetermined header period, determines QAM tap coefficients, and continuously updates the QAM tap coefficients calculated during the header period when a QAM signal is received during a predetermined payload period to equalize the QAM signal.

Preferably, the FD-QAM equalizer updates all of the FD-QAM tap coefficients at a predetermined symbol time and does not update the FD-QAM tap coefficients at a predetermined zero time. Preferably, during the header period, the QAM equalizer updates even tap coefficients including a predetermined center tap coefficient among the QAM tap coefficients at a predetermined symbol time and odd tap coefficients at a predetermined zero time when the center tap coefficient is an even tap coefficient, and updates odd tap coefficients including a predetermined center tap coefficient among the QAM tap coefficients at the symbol time and the even tap coefficients at the zero time when the center tap coefficient is an odd tap coefficient, and during the payload period, the QAM equalizer updates all of the QAM tap coefficients for every symbol.

According to another embodiment of the present invention, an adaptive channel equalizing system for a HomePNA receiver comprises an FD-QAM equalizer, which receives an FD-QAM signal, determines FD-QAM tap coefficients, and equalizes the FD-QAM signal using the FD-QAM tap coefficients; and a QAM equalizer, which receives a QAM signal, determines QAM tap coefficients, and equalizes the QAM signal using the QAM tap coefficients. The QAM equalizer receives the FD-QAM signal and calculates the QAM tap coefficients during a predetermined header period.

Preferably, the FD-QAM equalizer and the QAM equalizer are realized as in common hardware, thereby constituting a common equalizer, and the common equalizer operates at a speed two times faster than a predetermined symbol frequency so that the FD-QAM tap coefficients and the QAM tap coefficients are determined with a symbol period.

According to still another embodiment of the present invention an adaptive channel equalizing method for a HomePNA receivercomprises (a) receiving an FD-QAM signal during a predetermined header period, determining FD-QAM tap coefficients, and equalizing the FD-QAM signal using the FD-QAM tap coefficients; (b) receiving the FD-QAM signal during the header period and calculating QAM tap coefficients; (c) when the FD-QAM signal is received during a predetermined payload period, continuously updating the FD-QAM tap coefficients to equalize the FD-QAM signal; and (d) when a QAM signal is received during the payload period, continuously updating the QAM tap coefficients to equalize the QAM signal.

According to still another embodiment of the present invention, a carrier recovery circuit for a HomePNA receiver comprises a phase detector, which detects a phase difference between a reception symbol and a decision signal of the reception symbol to obtain an instantaneous phase difference, averages instantaneous phase differences during a predetermined period or time, and outputs the result of averaging; a loop filter, which filters the output signal of the phase detector; and a numerically controlled oscillator (NCO), which generates an oscillation signal having a variable phase in response to an output signal of the loop filter. The phase detector uses a phase difference between the reception symbol and the decision signal of the reception symbol as the instantaneous phase difference when the reception symbol is a data symbol of an FD-QAM signal or a symbol of a QAM signal and uses "0" as the instantaneous phase difference when the reception symbol is a zero symbol of the FD-QAM signal.

According to still another embodiment of the present invention, a carrier recovery method for a HomePNA receiver comprises (a) detecting a phase difference between a reception symbol of a reception signal and a decision signal of the reception symbol to obtain an instantaneous phase difference and averaging instantaneous phase differences during a predetermined period or time to output an average phase difference; (b) filtering the average phase difference; (c) generating an oscillation signal having a variable phase in response to the filtered average phase difference; and (d) multiplying the reception signal by the oscillation signal. Step (a) comprises using a phase difference between the reception symbol and the decision signal of the reception symbol as the instantaneous phase difference when the reception symbol is a data symbol of a frequency diverse quadrature amplitude modulation (FD-QAM) signal or a symbol of a quadrature amplitude modulation (QAM) signal and using "0" as the instantaneous phase difference when the reception symbol is a zero symbol of the FD-QAM signal.

BRIEF DESCRIPTION OF THE DRAWINGS

The above aspects and advantages of the present invention will become more apparent by describing in detail preferred embodiments thereof with reference to the attached drawings in which.

DETAILED DESCRIPTION OF PREFERRED EMBODIMENTS

Figure 1:
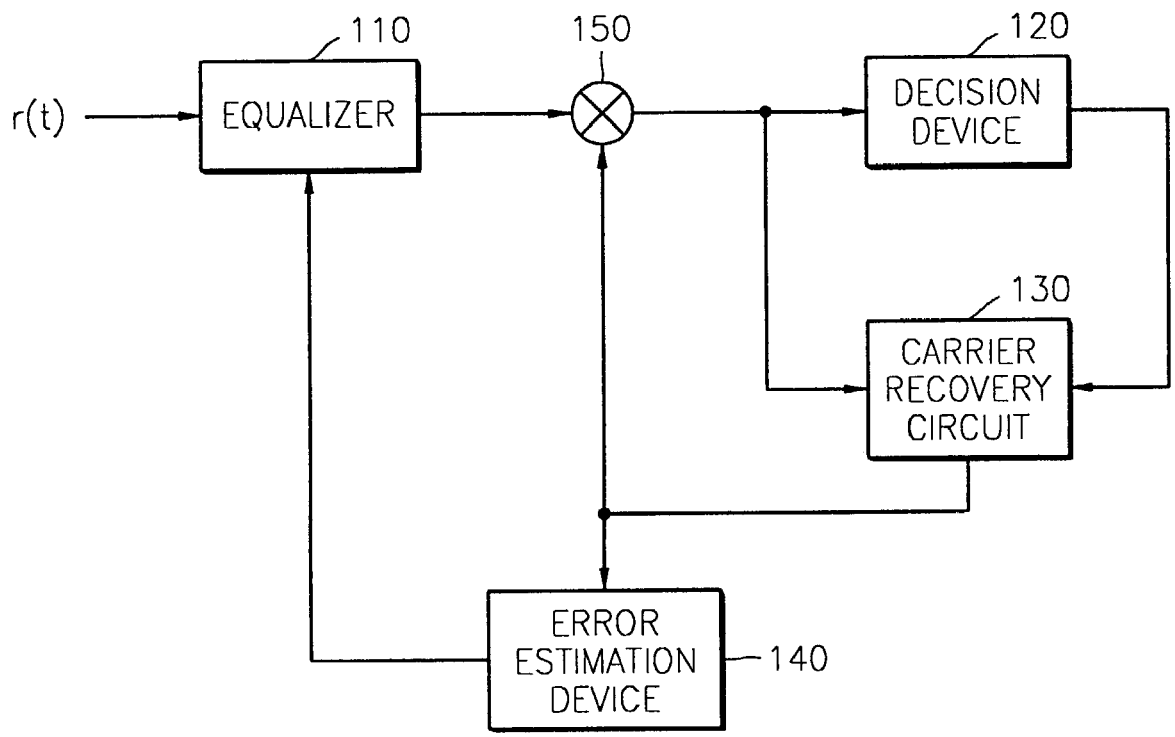
FIG. 1 is a schematic block diagram of a conventional equalizer and carrier recovery circuit system.
Figure 2:
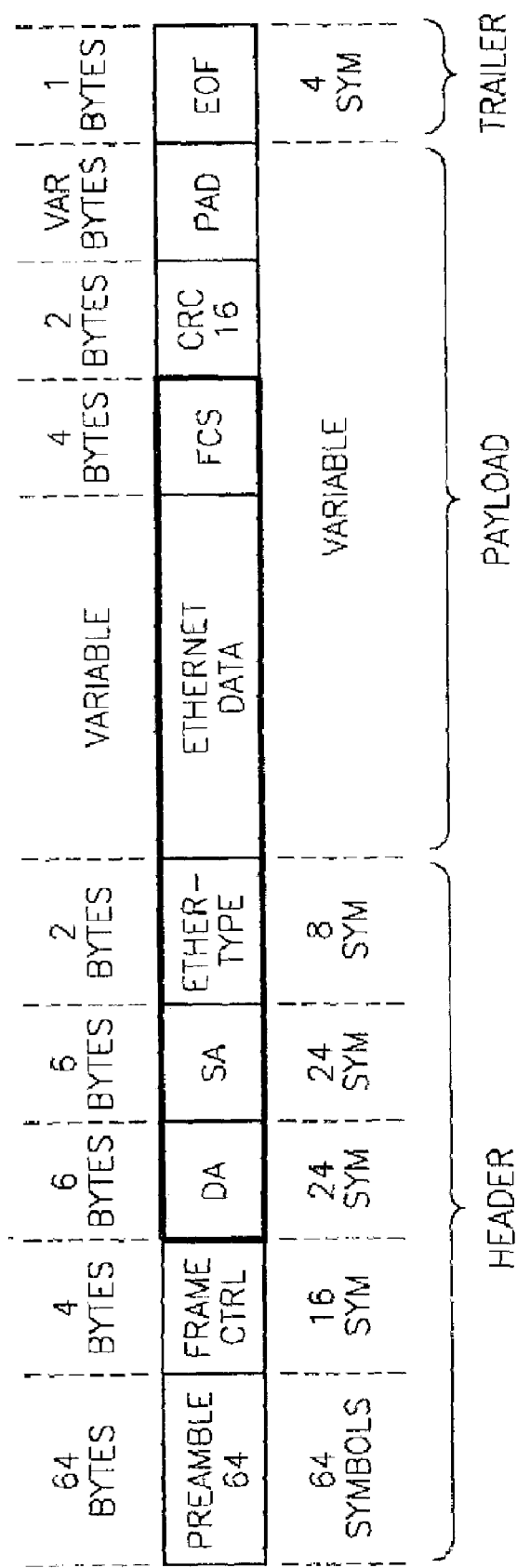
FIG. 2 is a diagram showing a frame structure in home phoneline networking alliance (HomePNA)
Figure 3:
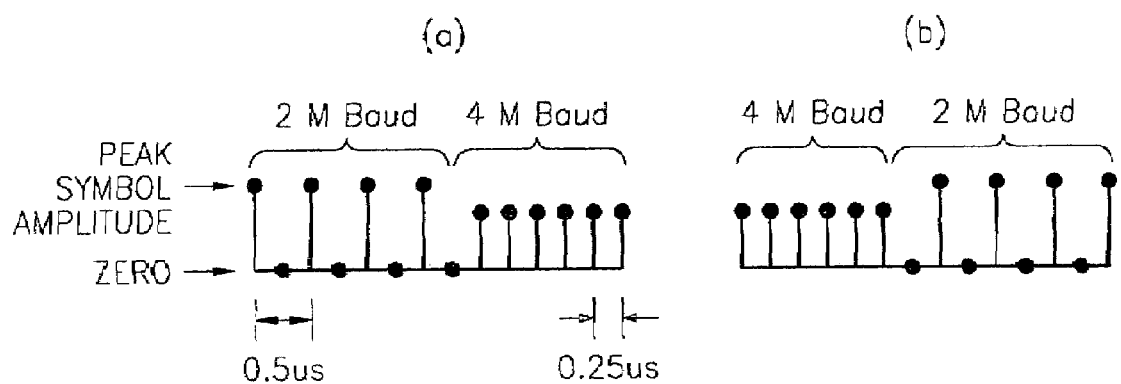
FIG. 3 is a diagram showing symbols in quadrature amplitude modulation (QAM) and frequency diverse QAM (FD-QAM)

Hereinafter, preferred embodiments of the present invention will be described in detail with reference to the attached drawings. In the drawings, the same reference numerals denote the same members.

According to an embodiment of the present invention, an adaptive equalizer and carrier recovery circuit compensates for signal distortion due to interference between adjacent symbols or carrier error regardless of signal characteristics of quadrature amplitude modulation (QAM) and frequency diverse QAM (FD-QAM), which are defined by the Home-PNA specification.

Figure 4:
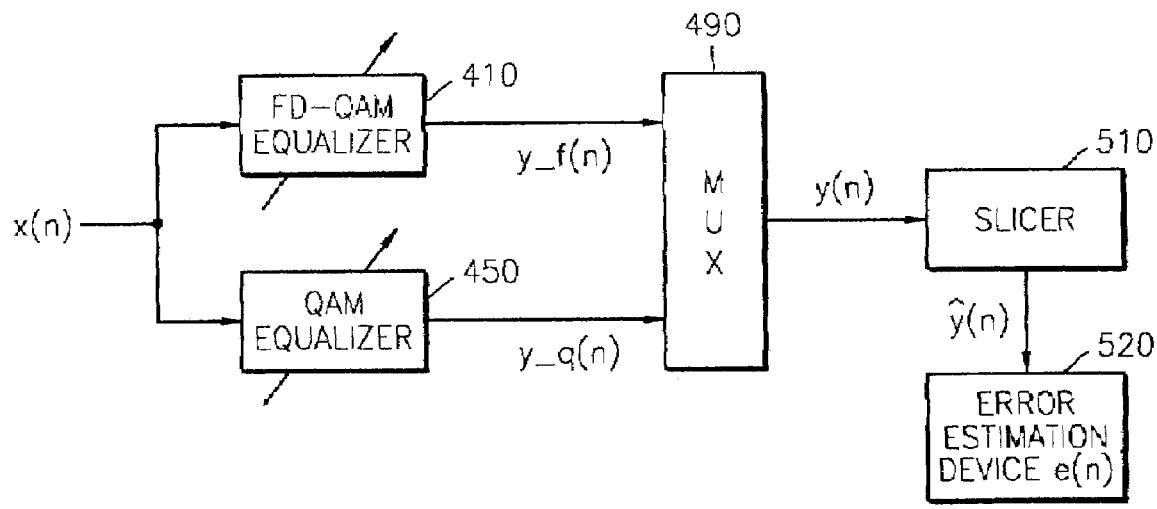
FIG. 4 is a schematic block diagram of a channel equalizing system according to an embodiment of the present invention.

FIG. 4 is a schematic block diagram of a channel equalizing system according to an embodiment of the present invention. The channel equalizing system shown in FIG. 4 estimates coefficients for equalizing a payload using QAM during a header period, so channel equalization can be accomplished regardless of a modulation mode for a data region (i.e., a payload region). For this operation, the channel equalizing system comprises a FD-QAM equalizer 410, an a QAM equalizer 450, a selection device 490 realized as a multiplexer (MUX), a slicer 510, and an error estimation device 520.

The FD-QAM equalizer 410 determines an FD-QAM tap coefficient for equalizing an FD-QAM signal. The FD-QAM signal is equlized using the FD-QAM tap coefficient. The QAM equalizer 450 receives the FD-QAM signal during a header period and determines a QAM tap coefficient. In addition, when a QAM signal is received during a payload period, the QAM equalizer 450 continuously updates the QAM tap coefficient calculated during the header period and equalizes the QAM signal.

A signal x(n) input to the FD-QAM equalizer 410 and the QAM equalizer 450 is a transmission symbol received through a channel and is referred to as an equalizer input symbol x(n). Accordingly, the equalizer input symbol x(n) can be expressed by convolution of a transmission symbol and a channel coefficient, as shown in Formula (1).

$$x(n) = s(n) * h(n) = \sum_{k=0}^{N} s(n-k)h(k) \quad (1)$$

Here, s(n) denotes the transmission symbol, and h(n) denotes the channel coefficient.

The FD-QAM equalizer 410 generates an FD-QAM equalizer output symbol y_f(n) by multiplying the equalizer input symbol x(n) by the FD-QAM tap coefficient. Similarly, the QAM equalizer 450 generates a QAM equalizer output symbol y_q(n) by multiplying the equalizer input symbol x(n) by the QAM tap coefficient. The selection device 490 selects either the FD-QAM equalizer output symbol y_f(n) or the QAM equalizer output symbol y_q(n) according to whether the equalizer input symbol x(n) is an FD-QAM signal or a QAM signal and outputs the selected signal as an equalizer output symbol y(n).

In FIG. 4, both the FD-QAM equalizer 410 and the QAM equalizer 450 operate, and one of two output signals is selected. However, either the FD-QAM equalizer 410 or the QAM equalizer 450 can be selectively operated according to whether the equalizer input symbol x(n) is an FD-QAM signal or QAM signal.

During the header period, that is, while the symbols of a header region are being received, the FD-QAM equalizer 410 equalizes a reception symbol, i.e., the equalizer input symbol x(n). During the header period, the QAM equalizer 450 does not equalize a reception symbol but continuously updates the QAM tap coefficient.

While the payload region is being received, an equalizer is selectively used according to a modulation mode for the payload region. In other words, when the modulation mode for the payload region is FD-QAM, the FD-QAM equalizer 410 is selected, and when the modulation mode for the payload region is QAM, the QAM equalizer 450 is selected.

The slicer 510 performs hard-decision on the equalizer output symbol y(n) to generate a hard-decision signal ŷ(n). The slicer 510 is a circuit that parses a signal from the signal y(n) having one or more signals with various magnitudes and/or phases.

The error estimation device 520 receives the equalizer output symbol y(n) and the hard-decision signal ŷ(n), estimates an error, and outputs an error signal e(n).

Figure 5:
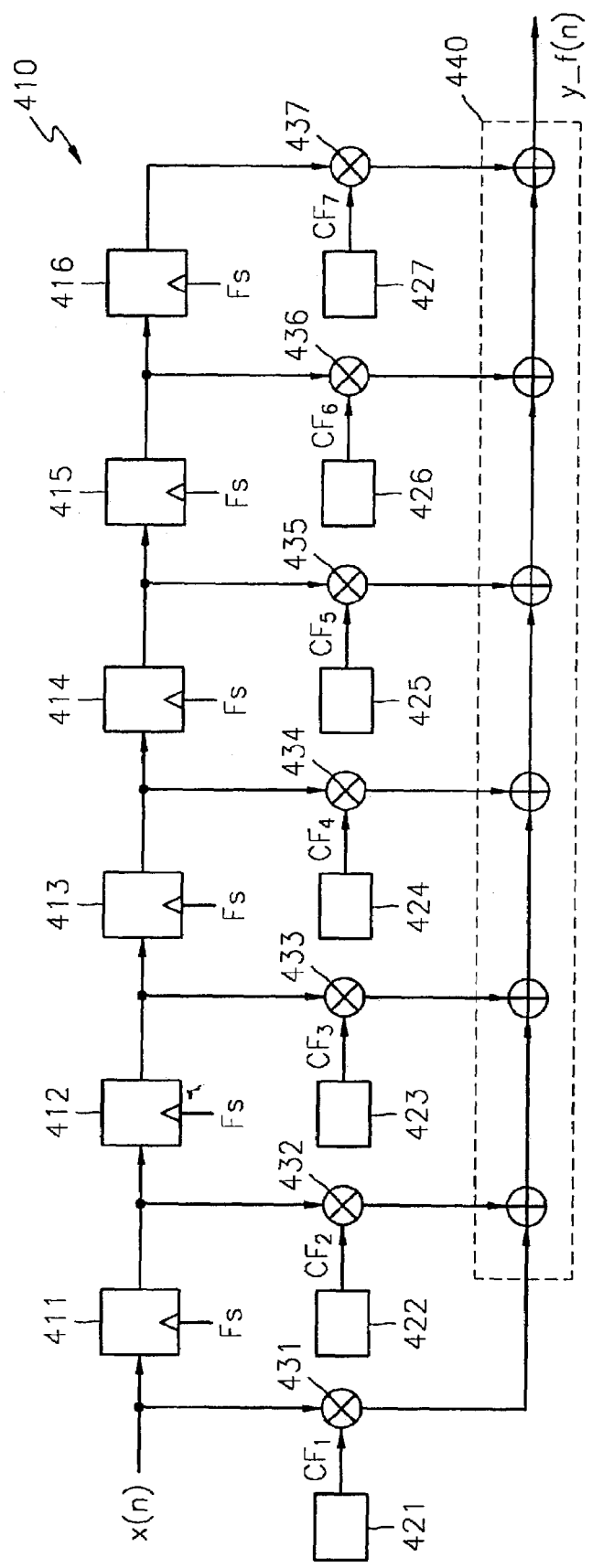
FIG. 5 is a detailed diagram of an FD-QAM equalizer shown in FIG. 4.

FIG. 5 is a detailed diagram of the FD-QAM equalizer 410 shown in FIG. 4. Referring to FIG. 5, the FD-QAM equalizer 410 comprises a plurality of storage blocks 411 through 416, a plurality of tap coefficient update blocks 421 through 427, a plurality of multipliers 431 through 437, and an adder 440. The storage blocks 411 through 416 are realized as six shift registers. For clarity, the six shift registers, 411 through 416, are referred to as first through sixth shift registers. The number of tap coefficient update blocks, 421 through 427, and the number of multipliers, 431 through 437, are one more than the number of shift registers, 411 through 416, i.e., seven.

The first through sixth shift registers, 431 through 437, are connected in series. Each of the first through sixth shift registers, 431 through 437, receives the equalizer input symbol x(n), delays it by a symbol period Ts (=1/Fs), and outputs the result of delay so that symbols are output in parallel within a symbol period. In other words, the received equalizer input symbol x(n) is input into the first shift register 411 with the symbol period Ts and sequentially input into the second through sixth shift registers, 412 through 416. Accordingly, symbols output from the first through sixth shift registers, 411 through 416, are delayed by Ts, 2Ts, 3Ts, 4Ts, 5Ts, and 6Ts, respectively, from the input symbol of the first shift register 411. That is, the symbols output from the first through sixth shift registers 411 through 416 are symbols that have been received earlier than the input symbol of the first shift register 411 by Ts, 2Ts, 3Ts, 4Ts, 5Ts, and 6Ts, respectively.

The input symbol of the first shift register 411 and the output symbols of the first through sixth shift registers, 411 through 416, are multiplied by first through seventh FD-QAM tap coefficients, $CF_1$ through $CF_7$, by the multipliers 431 through 437, respectively. The tap coefficient update blocks, 421 through 427 determine the first through seventh FD-QAM tap coefficients, $CF_1$ through $CF_7$, respectively, and perform updating. How the tap coefficient update blocks 421 through 427 calculate FD-QAM tap coefficients will be described later. The adder 440 adds all of the outputs of the multipliers 431 through 437 and outputs the result of the addition as the FD-QAM equalizer output symbol y_f(n).

Figure 6:
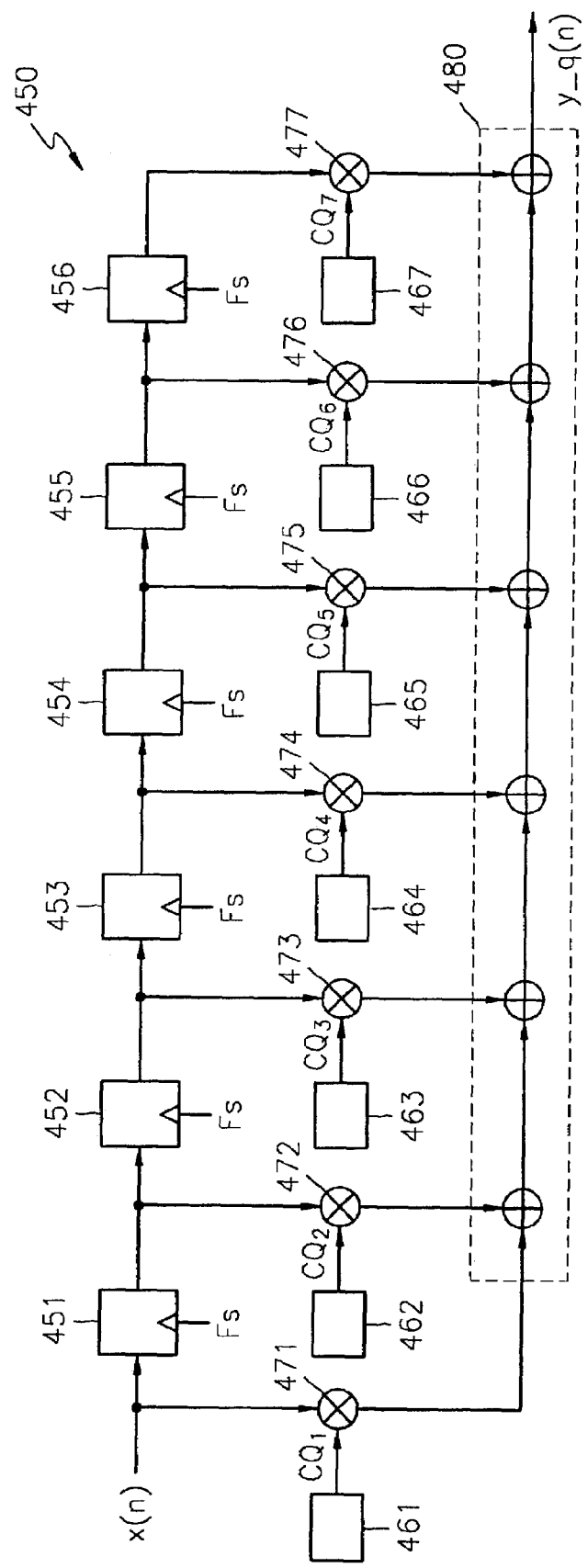
FIG. 6 is a detailed diagram of a QAM equalizer shown in FIG. 4.

FIG. 6 is a detailed diagram of the QAM equalizer 450 shown in FIG. 4. Referring to FIG. 6, the QAM equalizer 450 comprises a plurality of storage blocks, 451 through 456, a plurality of tap coefficient update blocks, 461 through 467, a plurality of multipliers, 471 through 477, and an adder 480. The storage blocks 451 through 456, the multipliers, 471 through 477, and the adder 480 shown in FIG. 6 have the same functions as the storage blocks, 411 through 416, the multipliers, 431 through 437, and the adder 440 shown in FIG. 5, and thus a detailed description thereof will be omitted.

The QAM equalizer 450 operates in a similar manner to the FD-QAM equalizer 410. However, the input symbol of the first shift register 451 and the output symbols of the first through sixth shift registers, 452 through 456, are multiplied by first through seventh QAM tap coefficients $CQ_1$ through $CQ_7$, which are updated in a different manner than the first through seventh FD-QAM tap coefficients $CF_1$ through $CF_7$. A signal output from the QAM equalizer 450 is the QAM equalizer output symbol y_q(n).

During an initial period of a frame, i.e., a header period, an FD-QAM signal is input into a channel equalizing system. Accordingly, a channel equalizing system according to the embodiment of the present invention estimates coefficients of an equalizer during the header period. The coefficients determined from the FD-QAM signal during the header period can be used to equalize a QAM signal of a payload region. In other words, during the header period, FD-QAM and QAM tap coefficients are determined using the FD-QAM signal, and during the payload period, FD-QAM and QAM tap coefficients are updated using the FD-QAM signal.

A least mean square (LMS) algorithm is used to update the tap coefficients of the FD-QAM equalizer 410 and the QAM equalizer 450. During the header period, the FD-QAM equalizer 410 updates the FD-QAM tap coefficients, $CF_1$ through $CF_7$, at a symbol time according to Formula (2). At a zero time, the FD-QAM equalizer 410 does not update the FD-QAM tap coefficients, $CF_1$ through $CF_7$. The symbol time indicates an instant of time when a nonzero data symbol is output from an equalizer, and the zero time indicates an instant of time when a zero symbol is output from an equalizer.

$$CF_{1,2,3,4,5,6,7}(n+1) = CF_{1,2,3,4,5,6,7}(n) + \Delta(n) = CF_{1,2,3,4,5,6,7}(n) + \mu e(n) sgn\{x^*(n)\} \quad (2)$$

Here, e(n) is an error signal indicating a difference between the equalizer output symbol y(n) and the hard-decision signal ŷ(n), μ is a stepsize determining a coefficient update range, and $CF_{1,2,3,4,5,6,7}$ indicates the first through seventh FD-QAM tap coefficients, $CF_1$ through $CF_7$.

During the header period, the QAM equalizer 450 updates QAM tap coefficients according to Formula (3) at a symbol time and according to Formula (4) at a zero time.

$$CQ_{2,4,6}(n+1) = CQ_{2,4,6}(n) + \Delta(n) = CQ_{2,4,6}(n) + \mu e(n) sgn\{x^*(n)\} \quad (3)$$

$$CQ_{1,3,5,7}(n+1) = CQ_{1,3,5,7}(n) + \Delta(n) = CQ_{1,3,5,7}(n) + \mu e(n) sgn\{x^*(n)\} \quad (4)$$

In Formulas (3) and (4), $CQ_{1,3,5,7}$ indicates the first, third, fifth, and seventh QAM tap coefficients, i.e., odd tap coefficients, and $CQ_{2,4,6}$ indicates the second, fourth, and sixth QAM tap coefficients, i.e., even tap coefficients. Accordingly, during the header period, the QAM equalizer 450 updates even tap coefficients at a symbol time and odd tap coefficients at a zero time.

Here, it is assumed that a center tap is an even tap, that is, one among the second, fourth, and sixth taps is the center tap. If the center tap is an odd tap, during the header period, the QAM equalizer 450 updates odd tap coefficients at a symbol time and even tap coefficients at a zero time.

If a modulation mode for the payload is FD-QAM, during the payload period, the FD-QAM equalizer 410 continuously updates FD-QAM tap coefficients according to Formula (2) as during the header period. If a modulation mode for the payload is QAM, the QAM equalizer 450 continuously updates QAM tap coefficients according to Formula (5) during the payload period.

$$CQ_{1,2,3,4,5,6,7}(n+1) = CQ_{1,2,3,4,5,6,7}(n) + \Delta(n) = CQ_{1,2,3,4,5,6,7}(n) + \mu e(n) sgn\{x^*(n)\} \quad (5)$$

Accordingly, during the payload period, the QAM equalizer 450 updates every tap coefficient per symbol. The FD-QAM equalizer 410 updates every tap coefficient at a symbol time but does not perform updating at a zero time.

Unlike the FD-QAM equalizer 410, during the header period, the QAM equalizer 450 updates even tap coefficients including a center tap coefficient at a symbol time and odd tap coefficients not including the center tap coefficient at a zero time.

Figure 7:
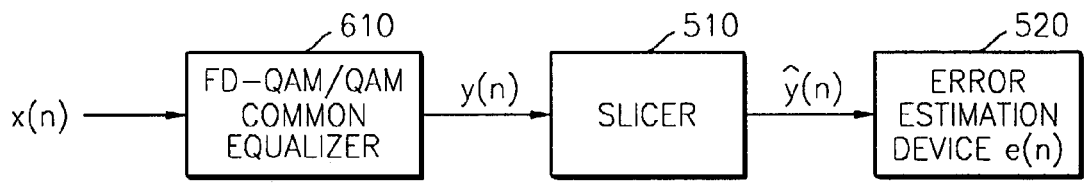
FIG. 7 is a schematic block diagram of a channel equalizing system according to another embodiment of the present invention.

FIG. 7 is a schematic block diagram of a channel equalizing system according to another embodiment of the present invention. Here, the channel equalizing system includes an FD-QAM/QAM common equalizer 610, a slicer 510, and an error estimation device 520.

Figure 8:
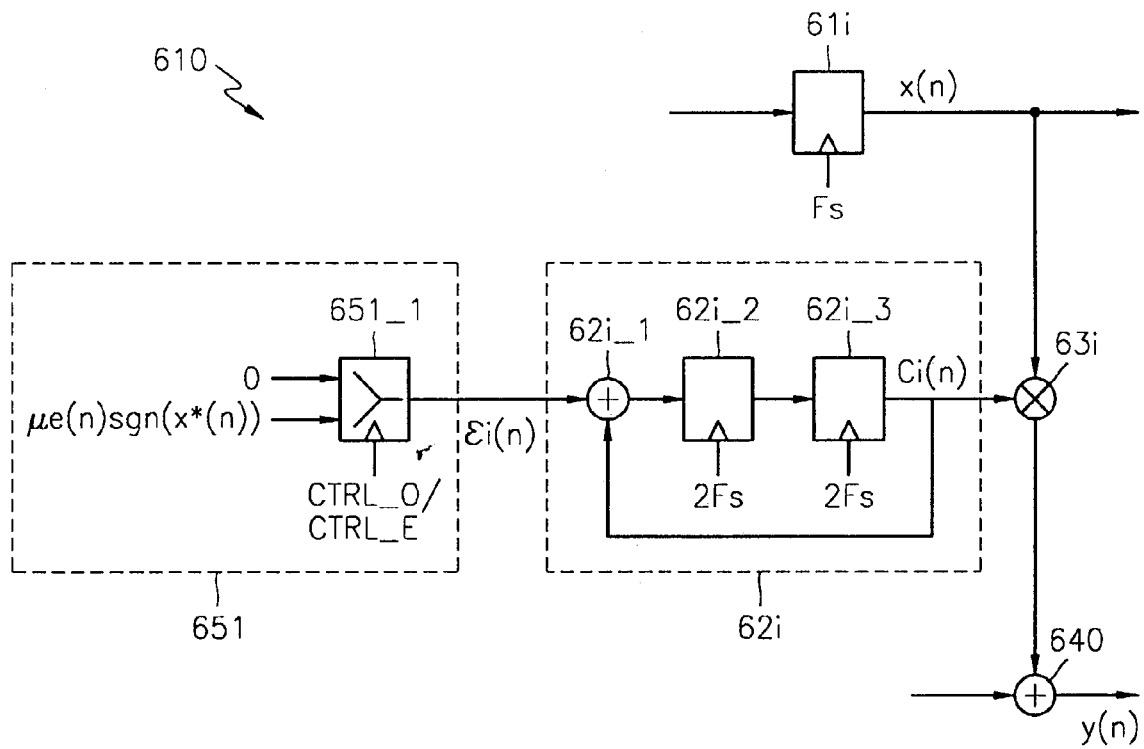
FIG. 8 is a diagram of an FD-QAM/QAM common equalizer shown in FIG. 7.

The FD-QAM/QAM common equalizer 610 has the same structure as the FD-QAM equalizer 410 shown in FIG. 5 or the QAM equalizer 450 shown in FIG. 6 with the exception that each tap coefficient update block is realized, as shown in FIG. 8 so that both an FD-QAM tap coefficient and a QAM tap coefficient can be updated using a single tap coefficient update block. Accordingly, hardware is simplified compared to the channel equalizing system shown in FIG. 4.

FIG. 8 is a diagram of then FD-QAM/QAM common equalizer 610 shown in FIG. 7. Like the FE-QAM equalizer 410, the FD-QAM/QAM common equalizer 610 comprises a plurality of shift registers 61i, a plurality of tap coefficient update blocks 62i, a plurality of multipliers 63i, and an adder 640. In FIG. 8, a single shift register 61i, a single tap coefficient update block 62i, and a single multiplier 63i are representatively shown. The FD-QAM/QAM common equalizer 610 also comprises an update signal generator 651 generating an update signal $\epsilon_i(n)$.

The shift registers 61i, the multipliers 63i, and the adder 640 have the same functions as the shift registers, 411 through 416, the multipliers, 431 through 437, and the adder 440 shown in FIG. 5, and thus a detailed description thereof will be omitted.

The tap coefficient update block 62i comprises a tap coefficient adder 62i_1, a first tap coefficient register 62i_2, and a second tap coefficient register 62i_3. The tap coefficient adder 62i_1 adds a tap coefficient $C_i(n)$ of the present tap to the update signal $\epsilon_i(n)$. The output of the tap coefficient adder 62i_1 is input to the first tap coefficient register 62i_2, and the output of the first tap coefficient register 62i_2 is input to the second tap coefficient register 62i_3. The first and second tap coefficient registers 62i_2 and 62i_3 operate at a speed of 2 Fs two times faster than a symbol frequency Fs.

The update signal generator 651 selectively outputs either "0" or a delta signal Δ(n) as the update signal $\epsilon_i(n)$ in response to a control signal CTRL_O or CTRL_E. Two kinds of control signal are used: an even control signal CTRL_E for controlling an update signal generator that generates an update signal $\epsilon_i(n)$ input to an even tap coefficient update block and an odd control signal CTRL_O for controlling an update signal generator that generates an update signal $\epsilon_i(n)$ input to an odd tap coefficient update block. Accordingly, it is preferable that the FD-QAM/QAM equalizer 610 comprises an update signal generator for an odd tap coefficient update block and an update signal generator for an even tap coefficient update block.

Figure 9:
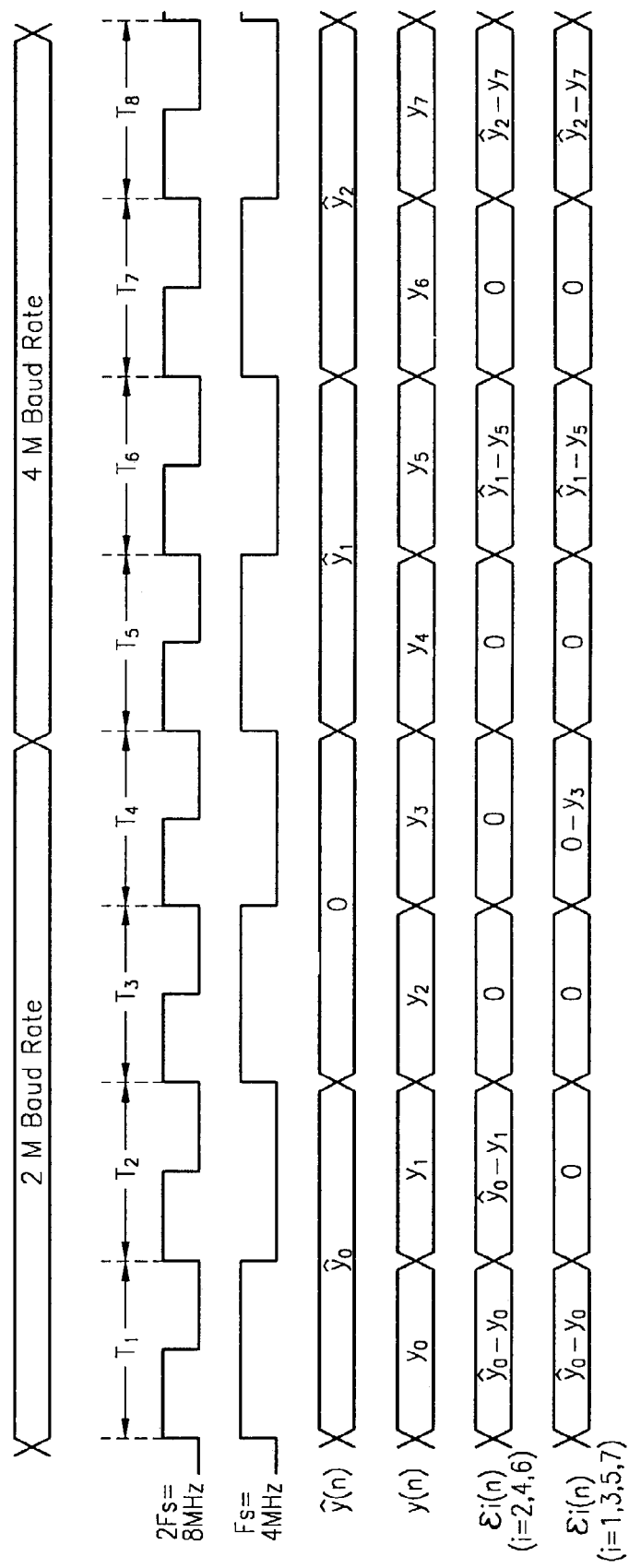
FIG. 9 is a diagram showing the relationship among an update signal, an equalizer output signal, and a hard-decision signal shown in FIG. 8.

FIG. 9 is a diagram showing the relationship among the update signal $\epsilon_i(n)$, the equalizer output signal y(n), and the hard-decision signal ŷ(n) shown in FIG. 8. Here, ½ of a symbol period, Ts/2=1/(2 Fs) is defined as an update period. It is assumed that during the initial four update periods, i.e., first through fourth update periods $T_1$ through $T_4$, a header signal is received at a 2 M baud rate, and then during the next four update periods, i.e., fifth through eighth update periods $T_5$ through $T_8$, a payload signal is received at a 4 M baud rate. In addition, it is assumed that μsgn(x*(n))=1. Then, the delta signal Δ(n) has the same value as the error signal e(n).

During odd update periods, i.e., the first, third, fifth, and seventh update periods $T_1$, $T_3$, $T_5$, and $T_7$, FD-QAM tap coefficients are updated. During even update periods, i.e., the second, fourth, and sixth update periods $T_2$, $T_4$, $T_6$, and $T_8$, QAM tap coefficients are updated.

The equalizer input signal x(n) is input during two update periods, i.e., a single symbol period. In case of a 2 M baud rate, a data symbol and a zero symbol are alternately received, so the data symbol is input during the first and second update periods $T_1$ and $T_2$, and a zero symbol is input during the third and fourth update periods $T_3$ and $T_4$. In case of a 4 M baud rate, only data symbols are continuously input.

Since FD-QAM tap coefficients and QAM tap coefficients are alternately updated with a symbol period, the equalizer output signal y(n) is output with an update period. Equalizer output signals y(n) output during the first through eighth update periods $T_1$ through $T_8$ are $y_0, y_1, y_2, \ldots, y_7$. The slicer 510 performs hard decision on the equalizer output signal y(n) with a symbol period. Accordingly, the hard-decision signal ŷ(n) is output within a symbol period. Hard-decision signals $ŷ_0$, 0, $ŷ_1$, and $ŷ_2$ are output during four symbol periods. Since a zero symbol is input during the second symbol period, the hard-decision signal is 0.

The value of the update signal $\epsilon_i(n)$ is different depending on whether the update signal $\epsilon_i(n)$ is input to an odd tap update block or even tap update block and whether the update signal $\epsilon_i(n)$ is for an FD-QAM tap coefficient or QAM tap coefficient. As described above with reference to Formulas (2) through (5), during the header period, an FD-QAM tap coefficient is updated at a symbol time but is not updated at a zero time. The update signal $\epsilon_i(n)$ needs to be "0" to not update a tap coefficient. Accordingly, the update signal $\epsilon_i(n)$ is 0 during the third update period T3 corresponding to a zero time regardless of to which one of even and odd tap update blocks the update signal $\epsilon_i(n)$ is input.

As for QAM tap coefficients, during the header period, only an even tap coefficient is updated at a symbol time, and only an odd tap coefficient is updated at a zero time. Accordingly, during the second update period $T_2$ corresponding to a symbol time, the update signal $\epsilon_i(n)$ (i=1, 3, 5, 7) for an odd tap coefficient is 0. During the fourth update period $T_4$ corresponding to a zero time, the update signal $\epsilon_i(n)$ (i=2, 4, 6) for an even tap coefficient is 0.

When a QAM signal is received at a 4 M baud rate during the payload period, the FD-QAM tap coefficients do not need to be updated. Accordingly, during the fifth and seventh update periods $T_5$ and $T_7$ for the FD-QAM tap coefficients, the update signal $\epsilon_i(n)$ (i=1 through 7) is 0.

During update periods during which the update signal $\epsilon_i(n)$ is non zero, the update signal $\epsilon_i(n)$ is the same as the error signal e(n), so the update signal $\epsilon_i(n)$ is determined by subtracting the equalizer output signals y(n) from the hard-decision signal ŷ(n).

Figure 10:
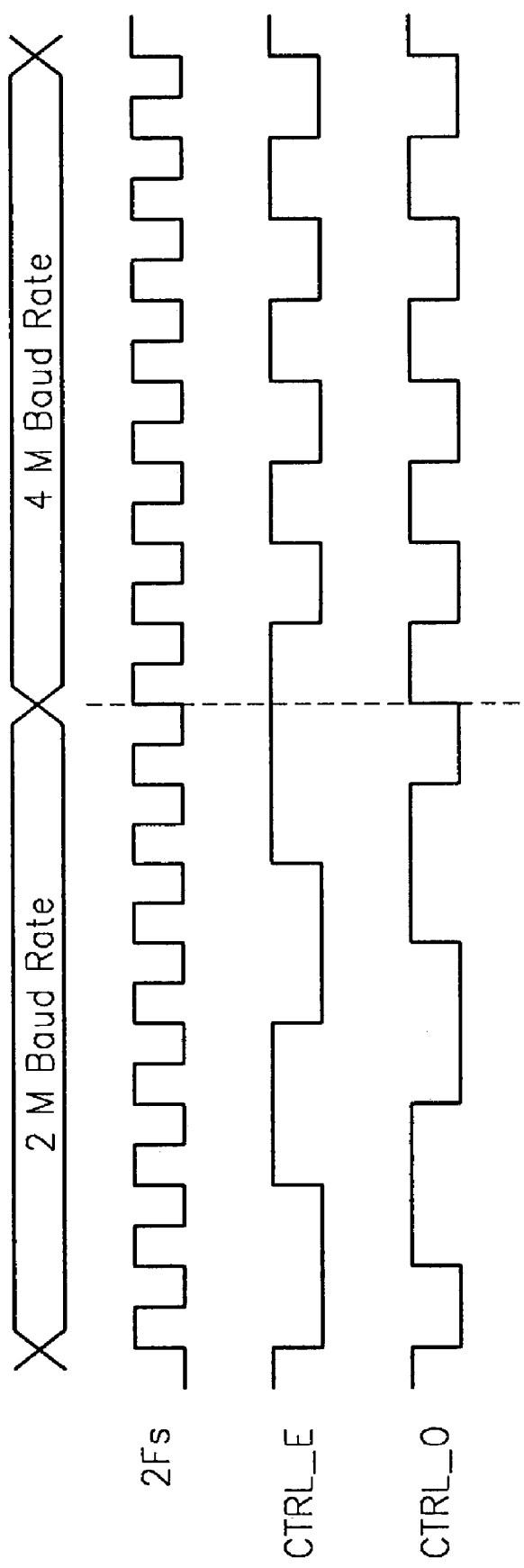
FIG. 10 is a diagram showing the waveforms of control signals shown in FIG. 8.

FIG. 10 is a diagram showing the waveforms of control signals shown in FIG. 8. To output the update signal $\epsilon_i(n)$ shown in FIG. 9, control signals need to have the waveforms shown in FIG. 10.

A MUX 651_1 of an update signal generator for even taps outputs the delta signal Δ(n) as the update signal $\epsilon_i(n)$ when the even control signal CTRL_E is in a low level and outputs "0" as the update signal $\epsilon_i(n)$ when the even control signal CTRL_E is in a high level.

Similarly, a MUX 651_1 of an update signal generator for odd taps outputs the delta signal Δ(n) as the update signal $\epsilon_i(n)$ when the odd control signal CTRL_O is in a low level and outputs "0" as the update signal $\epsilon_i(n)$ when the odd control signal CTRL_O is in a high level.

Figure 11:
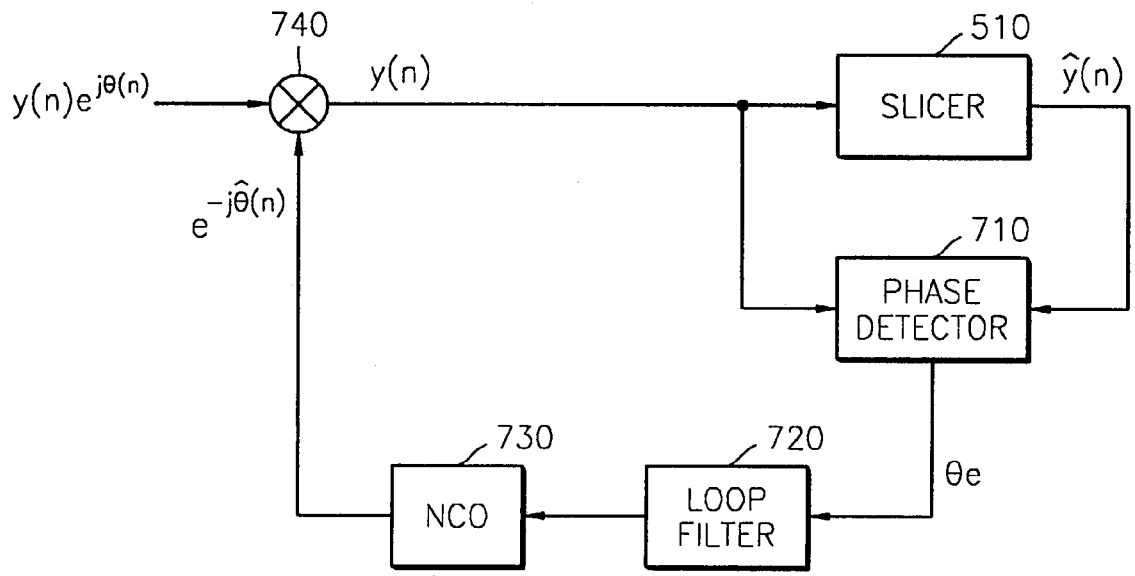
FIG. 11 is a block diagram of a carrier recovery circuit according to an embodiment of the present invention.

FIG. 11 is a block diagram of a carrier recovery circuit according to an embodiment of the present invention. Referring to FIG. 11, the carrier recovery circuit comprises a slicer 510, a phase detector 710, a loop filter 720, a numerically controlled oscillator (NCO) 730, and a mixer 740.

The phase detector 710 receives the input signal y(n) of the slicer 510 and the output signal of the slicer 510, i.e., the hard-decision signal ŷ(n), detects phase differences between the two received signals, averages the phase differences, and outputs an average phase difference $θ_e$. The loop filter 720 is a low-pass filter and filters the output signal $θ_e$ of the phase detector 710.

The NCO 730 generates a signal $e^{-jθ̂(n)}$ having a variable phase in response to the output signal of the loop filter 720. Preferably, a phase θ̂(n) of the signal $e^{-jθ̂(n)}$ generated from the NCO 730 has the same magnitude as a phase of a reception signal $y(n)e^{-jθ(n)}$. A phase error is removed by multiplying the reception signal $y(n)e^{-jθ(n)}$ by the output signal $e^{-jθ̂(n)}$ of the NCO 730.

Figure 12:
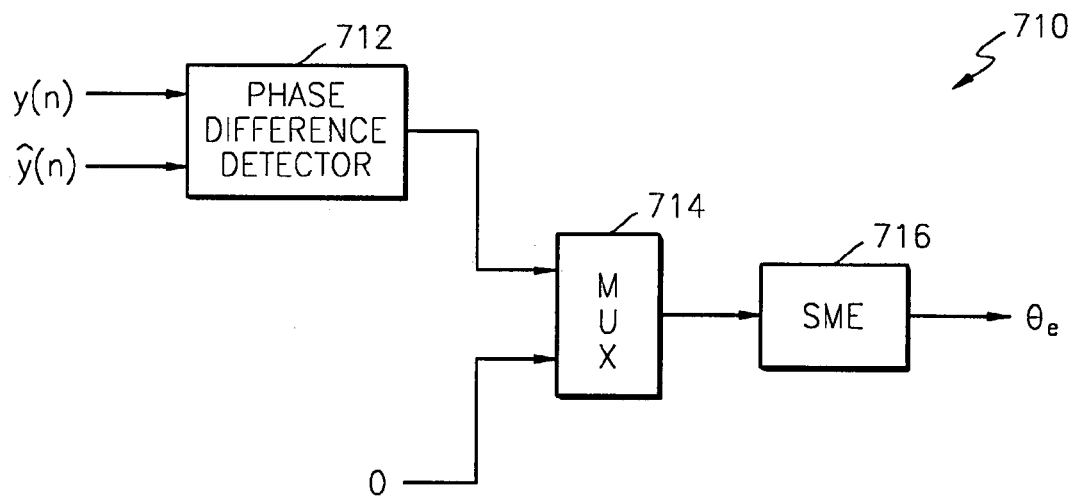
FIG. 12 is a detailed diagram of a phase detector shown in FIG. 11.

FIG. 12 is a detailed diagram of the phase detector 710 shown in FIG. 11. Referring to FIG. 11, the phase detector 710 comprises a phase difference detector 712, a selection device 714, and a sliding mean estimator (SME) 716.

The phase difference detector 712 receives the input signal y(n) of the slicer 510 and the hard-decision signal ŷ(n) and detects a phase difference between the two received signals. The selection device 714 can be realized as a MUX, which selects either a signal output from the phase difference detector 712 or a signal 0 and outputs the selected signal as an instantaneous phase difference.

When a zero symbol (i.e., a signal 0) of an FD-QAM signal is received, a value "0" is forcibly selected and output so that an inaccurate phase difference is not used. In other words, during a period of an FD-QAM signal, when a data symbol is received, the phase difference detector 712 operates to determine an accurate phase difference, and when a signal 0 is received, the phase difference detector 712 outputs a value "0" so that a frequency error and a phase error can be accurately determined. If a QAM signal is received, there is no zero symbol, so the phase difference detector 712 determines an instantaneous phase difference with respect to all symbols of the QAM signal.

The output signal of the phase difference detector 712 is an instantaneous value, which is generated with various influences such as a channel and noise. The SME 716 averages the output signals of the selection device 714 at predetermined time intervals to output the average phase difference $θ_e$. Since the average phase difference $θ_e$ determined by averaging instantaneous phase differences generated during a predetermined period of time from a current instant of time back to a particular past instant of time is used as the input of the loop filter 720, a carrier can be more accurately and reliably recovered compared to the case using an instantaneous phase difference as the input of the loop filter 720.

By combining a channel equalizing system and a carrier recovery circuit according to the present invention, a modulation signal of a HomePNA system using two types of modulation can be reliably channel-equalized and carrier-recovered.

A channel equalizing system according to the present invention can be disposed before a carrier recovery circuit according to the present invention, as shown in FIG. 1. Alternatively, a channel equalizing system according to the present invention can be disposed behind a mixer of a carrier recovery circuit according to the present invention and before a slicer of the carrier recovery circuit.

According to the present invention, even if different modulation modes exist within one frame, a received symbol signal can be reliably channel-equalized, and a carrier can be reliably recovered.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims.

What is claimed is:

1. An adaptive channel equalizing system for a home phoneline networking alliance (HomePNA) receiver, the channel equalizing system comprising:
    a frequency diverse quadrature amplitude modulation (FD-QAM) equalizer for determining FD-QAM tap coefficients and equalizing an FD-QAM signal input into the adaptive channel equalizing system;
    a quadrature amplitude modulation (QAM) equalizer for receiving the FD-QAM signal determines QAM tap coefficients during a predetermined header period, and continuously updating the QAM tap coefficients during a predetermined payload period to equalize the QAM signal upon receiving the QAM signal; and
    a multiplexer electrically coupled to the FD-QAM equalizer and the QAM equalizer, the FD-QAM equalizer and the QAM equalizer being connected in parallel, the multiplexer for selecting one of an equalized FD-QAM signal and an equalized QAM signal for output as an equalizer output symbol.

2. The channel equalizing system of claim 1, wherein the FD-QAM equalizer and the QAM equalizer update the FD-QAM tap coefficients and the QAM tap coefficients, respectively, using a least mean square algorithm.

3. The channel equalizing system of claim 1, wherein the FD-QAM equalizer updates all of the FD-QAM tap coefficients at a predetermined symbol time and does not update the FD-QAM tap coefficients at a predetermined zero time.

4. The channel equalizing system of claim 1, wherein within the header period, the QAM equalizer updates even tap coefficients including a predetermined center tap coefficient among the QAM tap coefficients at a predetermined symbol time and the odd tap coefficients at a predetermined zero time when the center tap coefficient is an even tap coefficient, and updates odd tap coefficients including a predetermined center tap coefficient among the QAM tap coefficients at the symbol time and the even tap coefficients at the zero time when the center tap coefficient is an odd tap coefficient, and during the payload period, the QAM equalizer updates all of the QAM tap coefficients for every symbol.

5. An adaptive channel equalizing system for a home phoneline networking alliance (HomePNA) receiver, the channel equalizing system comprising:
    a frequency diverse quadrature amplitude modulation (FD-QAM) equalizer for receiving an FD-QAM signal, determining FD-QAM tap coefficients, and equalizing the FD-QAM signal using the FD-QAM tap coefficients; and
    a quadrature amplitude modulation (QAM) equalizer for receiving a QAM signal, determining QAM tap coefficients, and equalizes the QAM signal using the QAM tap coefficients, wherein the QAM equalizer receives the FD-QAM signal and determines the QAM tap coefficients during a predetermined header period,
    wherein the FD-QAM equalizer and the QAM equalizer constitute a common equalizer, and the common equalizer operates at a speed two times faster than a predetermined symbol frequency so that the FD-QAM tap coefficients and the QAM tap coefficients are determined within a symbol period.

6. The channel equalizing system of claim 5, wherein the common equalizer determines the FD-QAM tap coefficients during ½ of each symbol period and determines the QAM tap coefficients during the remaining ½ of each symbol period.

7. The channel equalizing system of claim 5, wherein the common equalizer comprises:
    at least two tap coefficient update blocks for adding previous FD-QAM tap coefficients to a predetermined update signal and adding previous QAM tap coefficients to another predetermined update signal to update the FD-QAM tap coefficients and the QAM tap coefficients and storing the updated FD-QAM and QAM tap coefficients; and
    an update signal generator for selecting one among a signal 0 and a predetermined delta signal and outputting a selected signal as the update signal in response to a predetermined control signal.

8. The channel equalizing system of claim 2, wherein the delta signal is generated according to a difference between a hard-decision signal of an output signal of the common equalizer and the output signal of the common equalizer.

9. The channel equalizing system of claim 5, wherein within the header period, the common equalizer updates even tap coefficients including a predetermined center tap coefficient among the FD-QAM tap coefficients and the QAM tap coefficients at a predetermined symbol time and the odd tap coefficients among the QAM tap coefficients without updating the FD-QAM tap coefficients at a predetermined zero time when the center tap coefficient is an even tap coefficient, and updates odd tap coefficients including a predetermined center tap coefficient among the FD-QAM tap coefficients and the QAM tap coefficients at the symbol time and the even tap coefficients among the QAM tap coefficients without updating the FD-QAM tap coefficients at the zero time when the center tap coefficient is an odd tap coefficient.

10. The channel equalizing system of claim 5, wherein within a predetermined payload period, the common equalizer updates the FD-QAM tap coefficients only at a predetermined symbol time when the FD-QAM signal is received and updates the QAM tap coefficients for every symbol when the QAM signal is received.

11. An adaptive channel equalizing method for a home phoneline networking alliance (HomCPNA) receiver, the channel equalizing method comprising:
(a) receiving a frequency diverse quadrature amplitude modulation (FD-QAM) signal during a predetermined header period, determining FD-QAM tap coefficients, and equalizing the FD-QAM signal using the FD-QAM tap coefficients;
(b) receiving the FD-QAM signal during the header period and determining quadrature amplitude modulation (QAM) tap coefficients;
(c) updating, continuously, the FD-QAM tap coefficients to equalize the FD-QAM signal upon receiving the FD-QAM signal during a predetermined payload period; and
(d) updating, continuously, the QAM tap coefficients to equalize the QAM signal upon receiving a QAM signal is received during the payload period.

12. The channel equalizing method of claim 11, wherein in steps (a) and (c), the FD-QAM tap coefficients are updated at a predetermined symbol time and are not updated at a predetermined zero time.

13. The channel equalizing method of claim 11, wherein step (b) comprises updating even tap coefficients including a predetermined center tap coefficient among the QAM tap coefficients at a predetermined symbol time and odd tap coefficients at a predetermined zero time when the center tap coefficient is an even tap coefficient and updating odd tap coefficients including a predetermined center tap coefficient among the QAM tap coefficients at the symbol time and the even tap coefficients at the zero time when the center tap coefficient is an odd tap coefficient.

14. The channel equalizing method of claim 11, wherein step (c) comprises updating all of the QAM tap coefficients for each symbol.

15. An adaptive channel equalizing system for a home phoneline networking alliance (HomePNA) receiver, the channel equalizing system comprising:
a frequency diverse quadrature amplitude modulation (FD-QAM) equalizer for determining FD-QAM tap coefficients and equalizing an FD-QAM signal input into the adaptive channel equalizing system;
a quadrature amplitude modulation (QAM) equalizer for receiving the FD-QAM signal determines QAM tap coefficients during a predetermined header period, and continuously updating the QAM tap coefficients during a predetermined payload period to equalize the QAM signal upon receiving the QAM signal,
wherein within the header period, the QAM equalizer updates even tap coefficients including a predetermined center tap coefficient among the QAM tap coefficients at a predetermined symbol time and the odd tap coefficients at a predetermined zero time when the center tap coefficient is an even tap coefficient, and updates odd tap coefficients including a predetermined center tap coefficient among the QAM tap coefficients at the symbol time and the even tap coefficients at the zero time when the center tap coefficient is an odd tap coefficient, and
during the payload period, the QAM equalizer updates all of the QAM tap coefficients for every symbol.

* * * * *